(12) United States Patent
Pan

(10) Patent No.: US 7,127,121 B1
(45) Date of Patent: Oct. 24, 2006

(54) EFFICIENT IMPLEMENTATION OF A NOISE REMOVAL FILTER

(75) Inventor: Shien-Tai Pan, Laguna Niguel, CA (US)

(73) Assignee: ESS Technology, Inc., Fremont, CA (US)

( * ) Notice: Subject to any disclaimer, the term of this patent is extended or adjusted under 35 U.S.C. 154(b) by 584 days.

(21) Appl. No.: 10/102,042

(22) Filed: Mar. 20, 2002

(51) Int. Cl.
*G06K 9/40* (2006.01)

(52) U.S. Cl. .................. 382/260; 382/274; 382/275; 358/3.26; 358/3.27

(58) Field of Classification Search ............... 382/260, 382/274, 275, 261, 209, 219, 252, 205, 278; 358/3.26, 3.27, 463, 520
See application file for complete search history.

(56) References Cited

U.S. PATENT DOCUMENTS

| | | | | |
|---|---|---|---|---|
| 5,280,343 A | * | 1/1994 | Sullivan | .................... 348/488 |
| 5,329,382 A | * | 7/1994 | Mita | ........................... 382/192 |
| 5,519,456 A | * | 5/1996 | Inamori | ...................... 348/699 |
| 5,768,440 A | * | 6/1998 | Campanelli et al. | ........ 382/261 |
| 5,947,413 A | * | 9/1999 | Mahalanobis | .............. 244/3.17 |
| 5,969,777 A | * | 10/1999 | Mawatari | ............... 375/240.26 |
| 5,974,194 A | * | 10/1999 | Hirani et al. | ................ 382/262 |
| 6,061,100 A | * | 5/2000 | Ward et al. | ................ 348/607 |
| 6,108,455 A | * | 8/2000 | Mancuso | .................... 382/261 |
| 6,229,578 B1 | * | 5/2001 | Acharya et al. | ............ 348/607 |
| 6,295,373 B1 | * | 9/2001 | Mahalanobis et al. | ...... 382/210 |
| 6,459,734 B1 | * | 10/2002 | Kato et al. | ............. 375/240.12 |
| 6,667,766 B1 | * | 12/2003 | Matsutani et al. | .......... 348/241 |

* cited by examiner

*Primary Examiner*—Samir Ahmed
*Assistant Examiner*—Yosef Kassa
(74) *Attorney, Agent, or Firm*—Farjami & Farjami LLP

(57) ABSTRACT

A method for noise removal filtering is provided. The method includes selecting a characteristic of a test pixel, such as brightness, and comparing the brightness of the test pixel to the brightness of an adjacent pixel. The noise removal filtering is terminated if the test pixel brightness is equal to the adjacent pixel brightness, such that it can be determined that the test pixel has not been corrupted with noise data.

17 Claims, 3 Drawing Sheets

EFFICIENT IMPLEMENTATION OF A NOISE REMOVAL FILTER

BACKGROUND OF THE INVENTION

1. Field of the Invention

The invention relates generally to image processing and, more particularly, to an efficient implementation of a noise removal filter for image data.

2. Related Art

It is known in the art to filter image data to correct pixels that have been corrupted by noise. One drawback with such image data filtering is that it requires a significant amount of processor capacity. For example, it is usually necessary to perform a large number of operations using pixel data of a test pixel and adjacent pixels. These operations are performed regardless of whether the test pixel has actually been corrupted by noise.

SUMMARY

In accordance with the present invention, a system and method for noise removal filtering are provided that overcome known problems with systems and methods for noise removal filtering.

In particular, a system and method for noise removal filtering are provided that stop noise removal filtering for a pixel as soon as it is determined that the pixel data has not been corrupted by noise.

In accordance with an exemplary embodiment of the present invention, a method for noise removal filtering is provided. The method includes selecting a characteristic of a test pixel, such as brightness, and comparing the brightness of the test pixel to the brightness of an adjacent pixel. The noise removal filtering is terminated if the test pixel brightness is equal to the adjacent pixel brightness, such that it can be determined that the test pixel has not been corrupted by noise.

The present invention provides many important technical advantages. One important technical advantage of the present invention is a system and method for noise removal testing that allow testing for a pixel to be stopped as soon as it is determined that the pixel data has not been corrupted with noise, such as by comparing the pixel to adjacent pixels and stopping testing when it is determined that the pixel data is equal to or bounded by adjacent pixel data.

Those skilled in the art will further appreciate the advantages and superior features of the invention together with other important aspects thereof on reading the detailed description that follows in conjunction with the drawings.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views, and wherein.

DETAILED DESCRIPTION

The present invention provides for an efficient noise removal filter that optimizes the processing requirements for performing noise filtering of image data. In one exemplary embodiment, if it is determined that a characteristic of a test pixel is equal to a characteristic of one of two or more adjacent pixels, such as brightness, the noise removal filter process terminates for that pixel.

Figure 1:
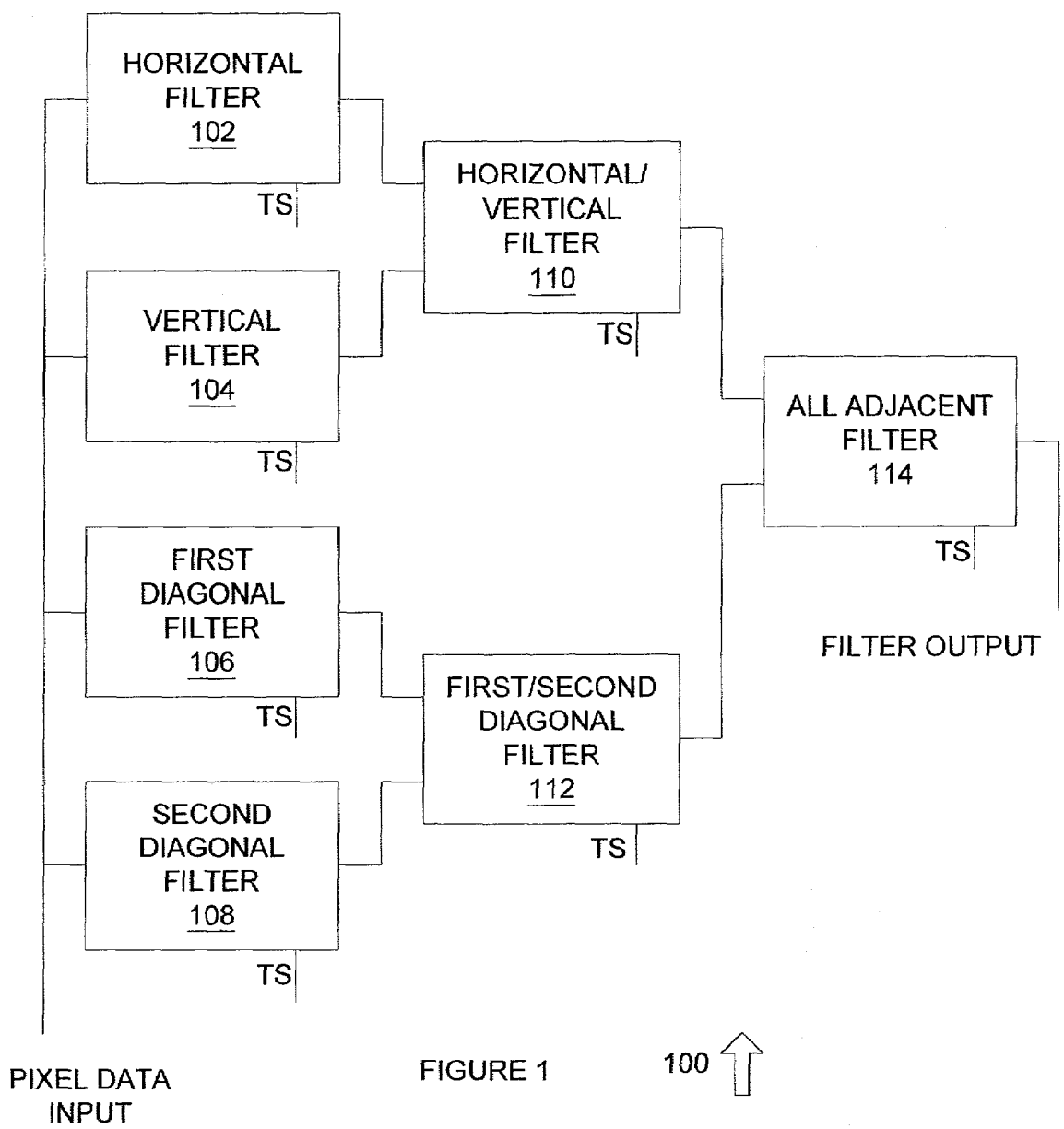
FIG. 1 is a diagram of a noise removal filter in accordance with an exemplary embodiment of the present invention.

FIG. 1 is a diagram of a noise removal filter 100 in accordance with an exemplary embodiment of the present invention. Noise removal filter 100 includes a plurality of system stages at which a characteristic of a test pixel is compared to a characteristic of surrounding pixels to determine whether the test pixel is a candidate for noise removal processing, such as where it is greater than or lesser than the characteristic value of each adjacent pixel. Each system stage can be implemented in hardware, software, or a suitable combination of hardware and software, and can be one or more hardware systems, or one or more software systems operating on a suitable processing platform. As used herein, a hardware system can be one or more semiconductor devices, an application specific integrated circuit, a field programmable gate array, or other suitable systems or components. A software system can include one or more objects, agents, lines of code, threads, subroutines, databases, application programming interfaces (APIs), or other suitable data structures, source code (human readable), object code (machine readable), and can include two or more different lines of code or suitable data structures operating in two or more separate software applications, on two or more different processing platforms, or in other suitable architectures. In one exemplary embodiment, a software system can include one or more lines of code or other suitable software structures operating in a general purpose software application, such as an operating system, and one or more lines of code or other suitable software structures operating in a specific purpose software application. In another exemplary embodiment, a software system can be implemented as a distributed software system, on a different processing platform than that shown in the exemplary embodiments herein, or in other suitable manners.

Horizontal filter 102 is a system stage where a horizontal median of three points process is performed. The horizontal median of three points process includes determining whether the characteristic of the test pixel is equal to or falls within the characteristic of each of two horizontally adjacent pixels, in which case the analysis of the test pixel terminates, as a test pixel having a characteristic that falls within or is equal to the characteristic of an adjacent pixel will not generate image "noise," even if the characteristic of that pixel is in fact the product of noise. For example, when the pixel characteristic is brightness, if the brightness of the test pixel is not less than the minimum brightness of a horizontally-adjacent pixel and is not greater than the maximum brightness of a horizontally-adjacent pixel, then the test pixel brightness will not appear as noise and subsequent noise filter processing can be suspended for the test pixel. If the characteristic of the test pixel is greater than the maximum of the characteristic of the two horizontally-adjacent pixels, or is less than the minimum of the characteristic of the two horizontally-adjacent pixels, then it is necessary to perform additional analysis to determine whether noise removal processing for the test pixel is required. A data value indicating that the characteristic of both of the horizontally-adjacent pixels were either lesser or greater than the characteristic of the test pixel can also be output by horizontal filter 102, such as a "0" if both were less and a "1" if both were greater, the least or greatest characteristic value, or other suitable data values.

Vertical filter 104 is a system stage where a vertical median of three points process is performed. The vertical median of three points process can be performed in parallel with the horizontal median of three points process performed by horizontal filter 102, can be performed after completion of processing at horizontal filter 102, or in other suitable manners. If the characteristic of the test pixel is brightness and is not less than the minimum of the characteristic of a vertically-adjacent pixel and is not greater than the maximum of the characteristic of a vertically-adjacent pixel, then the test pixel characteristic will not appear as noise and subsequent noise filter processing can be suspended for the test pixel. If the characteristic of the test pixel is greater than the maximum of the characteristic of the two vertically-adjacent pixels, or is less than the minimum of the characteristic of the two vertically-adjacent pixels, then it is necessary to perform additional analysis to determine whether noise removal processing for the test pixel is required. A data value indicating that the characteristic of both of the vertically-adjacent pixels were either lesser or greater than the characteristic of the test pixel can also be output by vertical filter 104, such as a "0" if both were less and a "1" if both were greater, the least or greatest characteristic value, or other suitable data values.

First diagonal filter 106 performs a median of three points process, such as in a first of two possible diagonal directions. The first diagonal median of three points process can be performed in parallel with horizontal filter 102 and vertical filter 104, respectively, can be performed after completion of other filtering, or in other suitable manners. If the characteristic of the test pixel is brightness and is not less than the minimum of the characteristic of the first two diagonally-adjacent pixels and is not greater than the maximum of the characteristic of the first two diagonally-adjacent pixels, then the test pixel characteristic will not appear as noise and subsequent noise filter processing can be suspended for the test pixel. If the characteristic of the test pixel is greater than the maximum of the characteristic of the first two diagonally-adjacent pixels, or is less than the minimum of the characteristic of the first two diagonally-adjacent pixels, then it is necessary to perform additional analysis to determine whether noise removal processing for the test pixel is required. A data value indicating that the characteristic of both of the first two diagonally-adjacent pixels were either lesser or greater than the characteristic of the test pixel can also be output by first diagonal filter 106, such as a "0" if both were less and a "1" if both were greater, the least or greatest characteristic value, or other suitable data values.

Second diagonal filter 108 also performs a median of three points process, such as in a second of two possible diagonal directions. The second diagonal median of three points process can be performed in parallel with horizontal filter 102, vertical filter 104, and first diagonal filter 106, can be performed after completion of other filtering, or in other suitable manners. If the characteristic of the test pixel is brightness and is not less than the minimum of the characteristic of the second two diagonally-adjacent pixels and is not greater than the maximum of the characteristic of the second two diagonally-adjacent pixels, then the test pixel characteristic will not appear as noise and subsequent noise filter processing can be suspended for the test pixel. If the characteristic of the test pixel is greater than the maximum of the characteristic of the second two diagonally-adjacent pixels, or is less than the minimum of the characteristic of the second two diagonally-adjacent pixels, then it is necessary to perform additional analysis to determine whether noise removal processing for the test pixel is required. A data value indicating that the characteristic of both of the second two diagonally-adjacent pixels were either lesser or greater than the characteristic of the test pixel can also be output by second diagonal filter 108, such as a "0" if both were less and a "1" if both were greater, the least or greatest characteristic value, or other suitable data values.

Horizontal/vertical filter 110 performs a median of three points process on the test pixel and the output pixels from horizontal filter 102 and vertical filter 104. If the test pixel characteristic is brightness and is not less than the minimum of the characteristic of the output pixels from horizontal filter 102 and vertical filter 104 and is not greater than the maximum of the characteristic of the output pixels from horizontal filter 102 and vertical filter 104, then the test pixel characteristic will not appear as noise and subsequent noise filter processing can be suspended for the test pixel. If the test pixel characteristic is greater than the maximum of the characteristic of the output pixels from horizontal filter 102 and vertical filter 104, or is less than the minimum of the characteristic of the output pixels from horizontal filter 102 and vertical filter 104, then it is necessary to perform additional analysis to determine whether noise removal processing for the test pixel is required. A data value indicating that the characteristic of all of the vertically- and horizontally-adjacent pixels were either lesser or greater than the characteristic of the test pixel can also be output by horizontal/vertical filter 110, such as a "0" if all were less and a "1" if all were greater, the least or greatest characteristic value, or other suitable data values.

First/second diagonal filter 112 performs a median of three points process on the test pixel and the output pixels of the first diagonal filter 106 and second diagonal filter 108. If the test pixel characteristic is brightness and is not less than the minimum of the characteristic of the output pixels of the first diagonal filter 106 and second diagonal filter 108 and is not greater than the maximum of the characteristic of the output pixels of the first diagonal filter 106 and second diagonal filter 108, then the test pixel characteristic will not appear as noise and subsequent noise filter processing can be suspended for the test pixel. If the test pixel characteristic is greater than the maximum of the characteristic of the output pixels of the first diagonal filter 106 and second diagonal filter 108, or is less than the minimum of the characteristic of the output pixels of the first diagonal filter 106 and second diagonal filter 108, then it is necessary to perform additional analysis to determine whether noise removal processing for the test pixel is required. A data value indicating that the characteristic of all of the diagonally-adjacent pixels were either lesser or greater than the characteristic of the test pixel can also be output by first/second diagonal filter 112, such as a "0" if all were less and a "1" if all were greater, the least or greatest characteristic value, or other suitable data values.

All adjacent filter 114 performs a median of three points process on the test pixel and the output pixels of the horizontal/vertical filter 110 and the first/second diagonal filter 112. If the test pixel characteristic is brightness and is not less than the minimum of the characteristic of the output pixels of the horizontal/vertical filter 110 and the first/second diagonal filter 112 and is not greater than the maximum of the characteristic of the output pixels of the horizontal/ vertical filter 110 and the first/second diagonal filter 112, then the test pixel characteristic will not appear as noise and subsequent noise filter processing can be terminated. If the test pixel characteristic is greater than the maximum of the characteristic of the output pixels of the horizontal/vertical filter 110 and the first/second diagonal filter 112, then noise on the test pixel is detected and removed by replacing the test pixel characteristic to the maximum of the characteristic of the output pixels of the horizontal/vertical filter 110 and the first/second diagonal filter 112. Likewise, if the test pixel characteristic is less than the minimum of the characteristic of the output pixels of the horizontal/vertical filter 110 and the first/second diagonal filter 112, then noise on the test pixel is detected and removed by replacing the test pixel characteristic to the minimum of the characteristic of the output pixels of the horizontal/vertical filter 110 and the first/second diagonal filter 112. The noise removal filtering process for the test pixel is terminated after the noise is removed.

In operation, noise removal filter 100 optimizes noise removal processing of pixel data by stopping the filter analysis for a test pixel when it is determined that the test pixel has not been affected by noise. Comparison of a test pixel to each of the adjacent pixels is only performed in a statistically-small number of cases, such that noise removal filter processing requirements are minimized.

Figure 2:
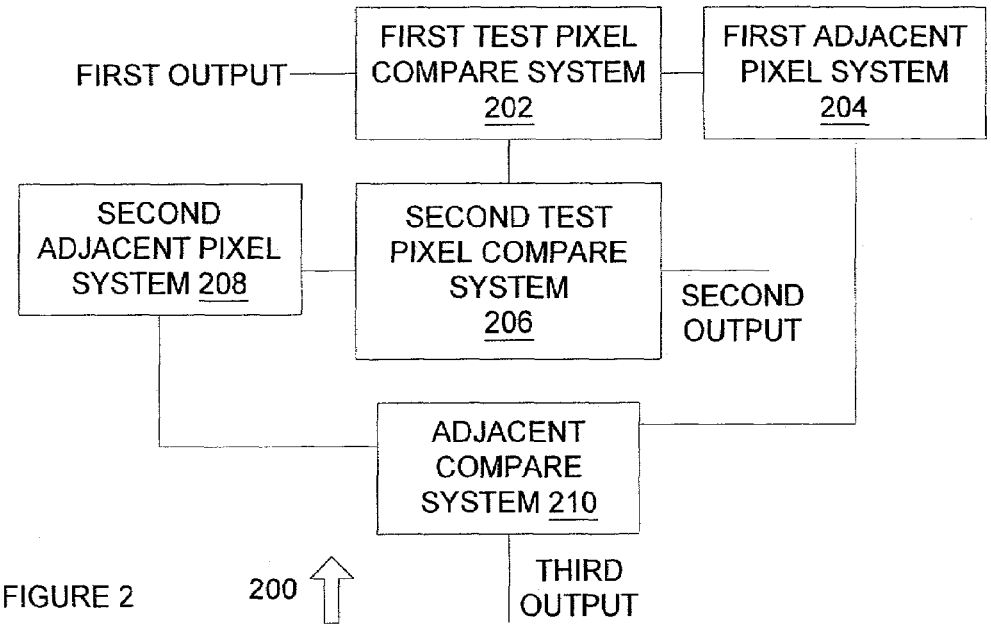
FIG. 2 is a diagram of a system for performing test pixel comparison with two adjacent pixels in accordance with an exemplary embodiment of the present invention.

FIG. 2 is a diagram of a system 200 for performing test pixel comparison with two adjacent pixels in accordance with an exemplary embodiment of the present invention. System 200 includes first test pixel compare system 202, first adjacent pixel system 204, second test pixel compare system 206, second adjacent pixel system 208, and adjacent compare system 210, each of which can be implemented in hardware, software, or a suitable combination of hardware and software, and which can be one or more hardware systems, or one or more software systems operating on a suitable processing platform.

First test pixel compare system 202 compares the test pixel characteristic, such as brightness, to the first adjacent pixel characteristic, such as with first adjacent pixel system 204, and generates a first output if the test pixel characteristic is equal to the first adjacent pixel characteristic. The first output can then be used to terminate the noise filter process for the current test pixel and to select the next test pixel. If the characteristic of the test pixel is not equal to the first adjacent pixel, a first flag is generated that indicates whether the first adjacent pixel was greater than or lesser than the test pixel. In one exemplary embodiment, a bubble sorting mechanism can be used to implement system 200, where the values of the test pixel and the adjacent pixels are swapped in a data buffer, or other suitable processes can be used.

Second test pixel compare system 206 receives the first flag and performs a comparison with the second adjacent pixel if the first flag is received. In this exemplary embodiment, if the first flag is not received, then processing by second test pixel compare system 206 is not performed. Second test pixel compare system 206 compares the test pixel characteristic with the characteristic of the second adjacent pixel, and generates a second output if the characteristic is equal. Otherwise, a second flag is generated that indicates whether the characteristic of the second adjacent pixel is greater than or lesser than the characteristic of the test pixel.

Adjacent compare system 210 receives the first and second flags and determines whether they are equal. In one exemplary embodiment, a "0" can be generated as a flag when the adjacent pixel characteristic is less than the test pixel characteristic, and a "1" can be generated as a flag when the adjacent pixel characteristic is greater than the test pixel characteristic. In this manner, if the first flag and the second flag are equal, then it can be determined that the characteristic of both adjacent pixels were either greater or lesser than the characteristic of the test pixel. Adjacent compare system 210 can then set the third output to equal the value of the two flags, the lesser or greater characteristic value of the two adjacent pixels, or other suitable data. If the flag values are not equal, this indicates that the test pixel characteristic value was between the characteristic value of the first and set adjacent pixel, in which the third output can be used to indicate that noise reduction filtering can be stopped. Adjacent compare system 210 can also be used in a stand-alone mode to perform the functions of horizontal/vertical filter 110, first/second diagonal filter 112, and all adjacent filter 114, such as where the inputs to those filters are flags indicating whether the test pixel characteristic at an earlier stage was greater than or lesser than the adjacent pixels.

In operation, system 200 is used to generate a filter stage output, such as for horizontal filter 102, vertical filter 104, first diagonal filter 106, second diagonal filter 108, horizontal/vertical filter 110, first/second diagonal filter 112, all adjacent filter 114, or other suitable filters. The output of system 200 can either be an indicator that noise removal filtering should be terminated, or a value for subsequent filtering.

Figure 3:
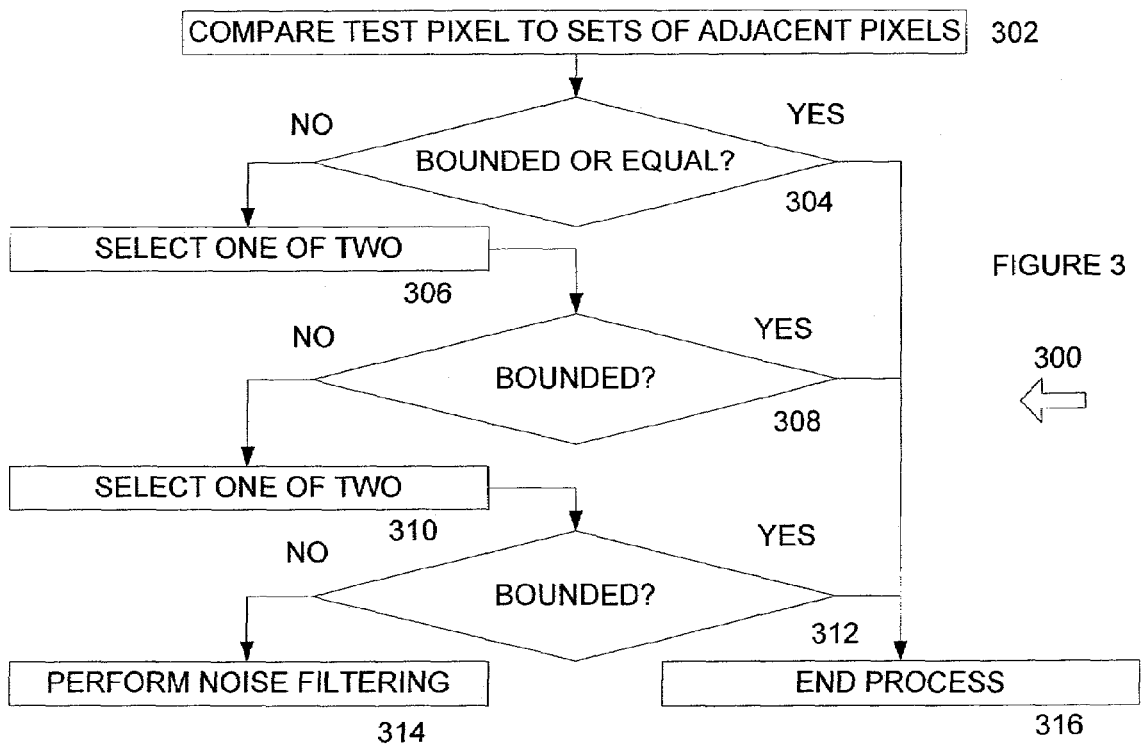
FIG. 3 is a flowchart of a method for noise reduction filtering in accordance with an exemplary embodiment of the present invention.

FIG. 3 is a flow chart of a method 300 for noise reduction filtering in accordance with an exemplary embodiment of the present invention. Method 300 begins at 302, where a characteristic of the test pixel is compared to the characteristic of sets of adjacent pixels. For example, where the test pixel is bounded by eight adjacent pixels, the sets can be selected by using the horizontally adjacent pixels, the vertically adjacent pixels, the diagonally adjacent pixels, randomly selected sets of pixels, or other suitable sets of pixels. The comparison can be done in parallel, in series, or in other suitable manners. The method then proceeds to 304.

At 304, it is determined whether the test pixel characteristic is bounded by or equal to the characteristics of the adjacent pixels. If the characteristic of the test pixel is bounded or equal, then the method proceeds to 316 and the noise reduction filtering process is terminated for that pixel. Likewise, if the comparison performed at 302 was in series, the method can return to 302 for a second comparison. Otherwise, the method proceeds to 306 where one of the two adjacent pixel characteristics are selected for a second determination of whether the test pixel is bounded by the adjacent pixels. In one exemplary embodiment, a flag can be generated that indicates whether the adjacent pixel characteristics are both greater than or lesser than the test pixel characteristic, the lesser or greater of the two adjacent pixel characteristics can be used, or other suitable data can be used. The method then proceeds to 308.

At 308, it is determined whether the test pixel characteristic is bounded by the characteristics of the adjacent pixels. In one exemplary embodiment, a flag can be received for two sets of adjacent pixels that indicates whether both of the pixels in either set were greater than or lesser than the test pixel. In this manner, it can be determined that the test pixel was bounded if the value of the flags is different, such as where the characteristics of both of one set of adjacent pixels were greater than the test pixel, and where the characteristics of both of the other set were less than the test pixel. Likewise, one of the two characteristic values from each set of adjacent pixels can be used, such as the pixel having the greatest characteristic value from each set, the pixel having the least characteristic value from each set, the pixel having the greatest characteristic value from one set and the least characteristic value from the second set, or other suitable data. If it is determined at 308 that the test pixel is bounded, then the method proceeds to 316 and the noise removal process for the pixel is terminated. Otherwise, the method proceeds to 310.

At 310, one of the four adjacent pixel characteristics is selected for a second determination of whether the test pixel is bounded by the adjacent pixels. In one exemplary embodiment, a flag can be generated that indicates whether the adjacent pixel characteristics are all greater than or lesser than the test pixel characteristic, the lesser or greater of the four adjacent pixel characteristics can be used, or other suitable data can be used. The method then proceeds to 312.

At 312, it is determined whether the test pixel characteristic is bounded by the characteristics of the adjacent pixels. In one exemplary embodiment, a flag can be received for two sets of adjacent pixels that indicates whether all four of the pixels in either set were greater than or lesser than the test pixel. In this manner, it can be determined that the test pixel was bounded if the value of the flags is different, such as where the characteristics of all four of one set of adjacent pixels were greater than the test pixel, and where the characteristics of all four of the other set were less than the test pixel. Likewise, one of the four characteristic values from each set of adjacent pixels can be used, such as the pixel having the greatest characteristic value from each set, the pixel having the least characteristic value from each set, the pixel having the greatest characteristic value from one set and the least characteristic value from the second set, or other suitable data. If it is determined at 310 that the test pixel is bounded, then the method proceeds to 316 and the noise removal process for the pixel is terminated. Otherwise, the method proceeds to 314 and noise removal filtering is performed.

In operation, method 300 allows noise removal filtering to be performed in a manner where the noise removal filtering is terminated as soon as it is determined that the test pixel has not been corrupted by noise. Method 300 compares the test pixel to sets of adjacent pixels, by first using sets of two adjacent pixels, and then by consolidating the sets into increasing numbers of pixels until all adjacent pixels can be compared to the test pixel. In this manner, testing for a test pixel that has not been corrupted by noise can be terminated prior to testing of each pixel in most cases.

Figure 4:
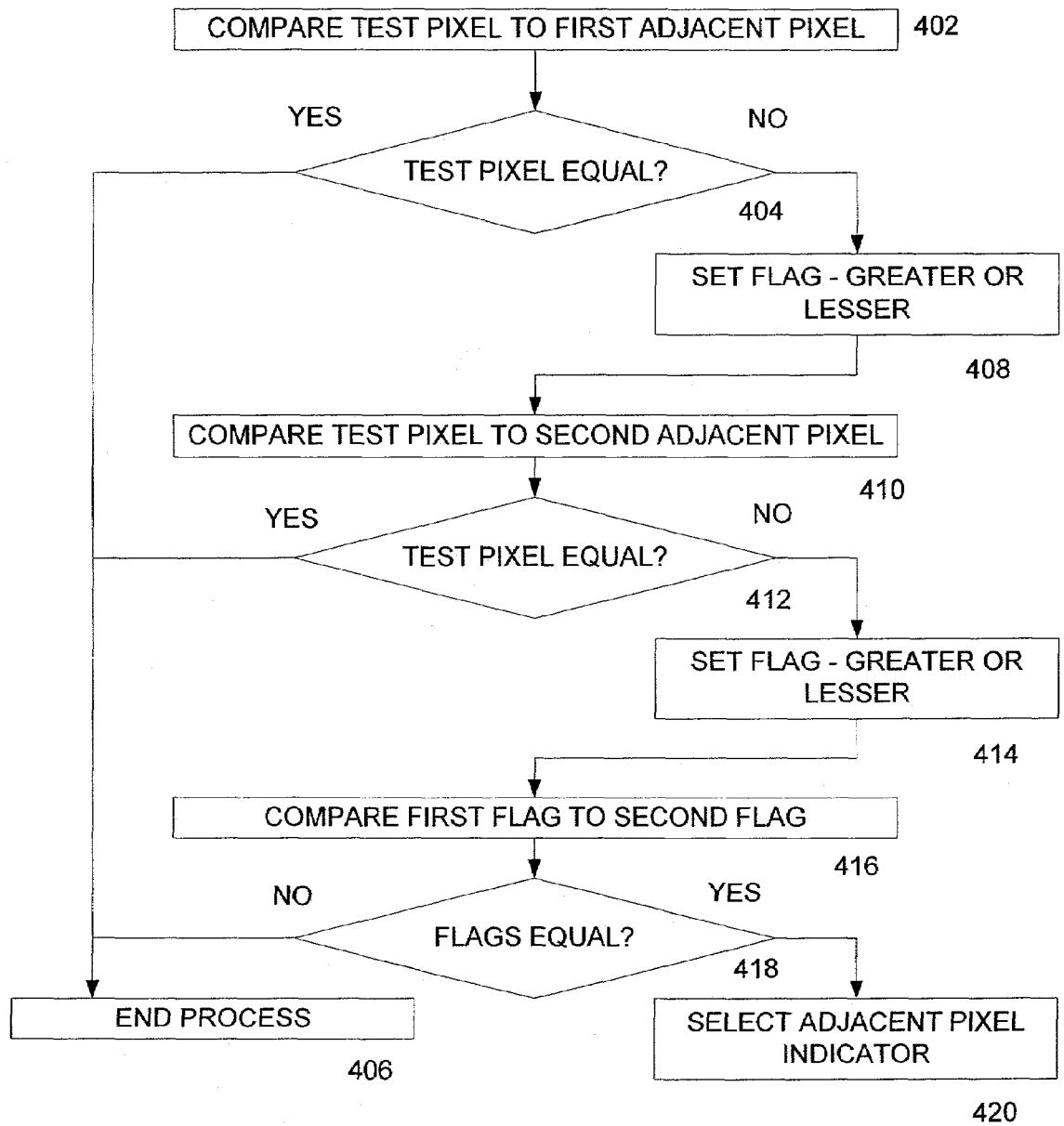
FIG. 4 is a flowchart of a method for noise removal filtering in accordance with an exemplary embodiment of the present invention.

FIG. 4 is a flowchart of a method 400 for noise removal filtering in accordance with an exemplary embodiment of the present invention. Method 400 begins at 402, where a test pixel characteristic is compared to a first adjacent pixel characteristic. The method then proceeds to 404 where it is determined whether the test pixel characteristic is equal to the first adjacent pixel characteristic. If the test pixel is equal, then the method proceeds to 406 and noise removal filtering for that pixel is terminated. Otherwise, the method proceeds to 408.

At 408, a flag is set indicating whether the first adjacent pixel characteristic is greater or lesser than the test pixel characteristic. In one exemplary embodiment, the flag can be "0" if the adjacent pixel characteristic is less than the test pixel characteristic, and "1" if the adjacent pixel characteristic is greater than the test pixel characteristic. Other suitable values can likewise be used. The method then proceeds to 410, where the test pixel characteristic is compared to a second adjacent pixel characteristic. The method then proceeds to 412, where it is determined whether the test pixel characteristic is equal to the second adjacent pixel characteristic. If the test pixel is equal, then the method proceeds to 406 and noise removal filtering for that pixel is terminated. Otherwise, the method proceeds to 414.

At 414, a flag is set indicating whether the second adjacent pixel characteristic is greater or lesser than the test pixel characteristic. In one exemplary embodiment, the flag can be "0" if the adjacent pixel characteristic is less than the test pixel characteristic, and "1" if the adjacent pixel characteristic is greater than the test pixel characteristic. Other suitable values can likewise be used. The method then proceeds to 416, where the first flag is compared to the second flag. The method then proceeds to 418 where it is determined whether the flags are equal. If the flags are not equal, this indicates that the test pixel characteristic was between the first adjacent pixel characteristic and the second adjacent pixel characteristic. The method then proceeds to 406 and the noise removal filtering processes terminates for the test pixel. Otherwise, an adjacent pixel indicator is selected, such as where additional sets of adjacent pixels will be analyzed to determine whether the test pixel should be filtered. These additional sets can be analyzed using a process similar to method 400, except that an additional comparison of flags or other process indicators is performed, such as that at 416 through 420, except that the output at 420 will be a pixel filter control if it is determined that the test pixel characteristic is greater than or lesser than the characteristic of all other adjacent pixels.

In operation, method 400 allows a test pixel to be compared to adjacent pixels to determine whether noise filtering should be performed on the pixel. Method 400 allows good pixels to be detected prior to comparison with all adjacent pixels, thus decreasing the amount of processing required for noise removal filtering of image data or other types of data that may be amenable to such filtering techniques.

While various embodiments of the invention have been described, it will be apparent to those of ordinary skill in the art that many more embodiments and implementations are possible that are within the scope of this invention.

What is claimed is:

1. A method for noise removal filtering comprising:
   selecting a characteristic of a test pixel;
   comparing the characteristic of the test pixel to a characteristic of a first adjacent pixel;
   comparing the characteristic of the test pixel to a characteristic of a second adjacent pixel;
   generating a flag if the characteristic of the first adjacent pixel and the characteristic of the second adjacent pixel are both different than the characteristic of the test pixel; and
   terminating the noise removal filtering if the flag is not generated and thereby indicating that the characteristic of the test pixel is not different than the characteristics of the adjacent pixels.

2. The method of claim 1, wherein the flag is generated if the first adjacent pixel characteristic and the second adjacent pixel characteristic are both greater than the test pixel characteristic.

3. The method of claim 1, wherein the flag is generated if the characteristic of the first adjacent pixel and the characteristic of the second adjacent pixel are both less than the characteristic of the test pixel.

4. The method of claim 1, further comprising:
   comparing the characteristic of the test pixel to a characteristic of a third adjacent pixel; and wherein the generating generates the flag if the characteristic of the first adjacent pixel, the characteristic of the second adjacent pixel and the characteristic of the third adjacent pixel are all different than the characteristic of the test pixel.

5. The method of claim 1, further comprising:
comparing the characteristic of the test pixel to a characteristic of a third adjacent pixel;
comparing the characteristic of the test pixel to a characteristic of a fourth adjacent pixel; and
wherein the generating generates the flag if the characteristic of the first adjacent pixel, the characteristic of the second adjacent pixel, the characteristic of the third adjacent pixel and the characteristic of the fourth adjacent pixel are all different than the characteristic of the test pixel.

6. The method of claim 5, wherein the characteristics of the first adjacent pixel, the second adjacent pixel, the third adjacent pixel, and the fourth adjacent pixel are each greater than the test pixel characteristic.

7. The method of claim 5, wherein the characteristics of the first adjacent pixel, the second adjacent pixel, the third adjacent pixel, and the fourth adjacent pixel are each less than the test pixel characteristic.

8. A system for noise removal filtering comprising:
a pixel data input receiving a test pixel characteristic and a first adjacent pixel characteristic;
a filter comparing the test pixel characteristic to the first adjacent pixel characteristic and comparing the test pixel characteristic to a second adjacent pixel characteristic;
a stage output providing flag output data of a first value if the test pixel characteristic is different than both the first adjacent pixel characteristic and the second adjacent pixel characteristic;
a noise filter testing stop output providing noise filter testing stop data if the stage output does not provide the flag output data of the first value and thereby indicating that the test pixel characteristic is not different than the adjacent pixel characteristics.

9. The system of claim 8 wherein the filter is a horizontal filter and the first adjacent pixel characteristic is for a pixel that is horizontally adjacent to a test pixel.

10. The system of claim 9 wherein the second adjacent pixel characteristic is for a pixel that is vertically adjacent to the test pixel, and wherein the system further comprising: a vertical filter comparing the test pixel characteristic to the vertically adjacent pixel characteristic.

11. The system of claim 9 wherein the second adjacent pixel characteristic is for a pixel that is diagonally adjacent to the test pixel, and wherein the system further comprising: a diagonal filter comparing the test pixel characteristic to the diagonally adjacent pixel characteristic.

12. The system of claim 8 wherein the stage outputs provides the flag output data of the first value if the test pixel characteristic is less than both the adjacent pixel characteristic and the second adjacent pixel characteristic.

13. A system for noise removal filtering comprising:
a first adjacent pixel system providing first adjacent pixel data; and
a test pixel compare system coupled to the first adjacent pixel system and comparing the first adjacent pixel data to test pixel data;
wherein the test pixel compare system further comprises a flag output that includes flag data and the test pixel compare system generates the flag data if the test pixel data is not equal to the first adjacent pixel data, and wherein the test pixel compare system generates a first output that includes noise removal filtering stop data.

14. The system of claim 13 wherein the test pixel compare system generates the first output that includes the noise removal filtering stop data if the first adjacent pixel data is equal to the test pixel data.

15. The system of claim 13 further comprising:
a second adjacent pixel system providing second adjacent pixel data; and
wherein the test pixel compare system generates a second output that includes noise removal filtering stop data if the second adjacent pixel data is equal to the test pixel data.

16. The system of claim 15 wherein the test pixel compare system generates second flag data if the test pixel data is not equal to the second adjacent pixel data.

17. The system of claim 16 further comprising an adjacent compare system receiving the flag data and the second flag data and generating noise removal filtering output data if the flag data equals the second flag data.

* * * * *